P. M. GELATT.
DIAL PLATE CONSTRUCTION.
APPLICATION FILED JULY 16, 1917.
1,297,459.
Patented Mar. 18, 1919.
Fig. 1
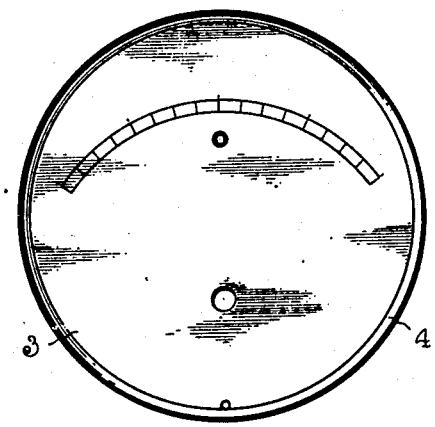
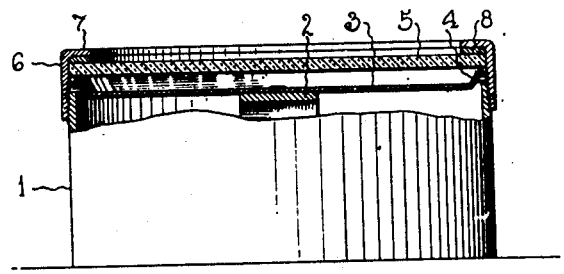
Fig. 2
Witnesses
Arthur F. Draper
Chas. W. Stauffer
Inventor
Philo M. Gelatt
By
Attorneys

UNITED STATES PATENT OFFICE.

PHILO M. GELATT, OF LA CROSSE, WISCONSIN.

DIAL-PLATE CONSTRUCTION.

1,297,459.

Specification of Letters Patent. Patented Mar. 18, 1919.

Application filed July 16, 1917. Serial No. 180,710.

*To all whom it may concern:*

Be it known that I, PHILO M. GELATT, a citizen of the United States of America, residing at La Crosse, in the county of La Crosse and State of Wisconsin, have invented certain new and useful Improvements in Dial-Plate Constructions, of which the following is a specification, reference being had therein to the accompanying drawings.

In the construction of gages for automobiles and of like indicating devices wherein a dial is confined in a casing and is swept by an index hand operated by mechanism contained within the casing, it is desirable that access be had to the interior and that the parts to be removed for obtaining such entrance thereto, be as few in number and as ready of readjustment in assembling again, as possible.

This invention relates to a gage casing and to a disposition thereof whereby access can be had thereto readily through a construction which embodies very few parts which are quickly and readily assembled.

The invention consists in the matters hereinafter set forth, and are particularly pointed out in the appended claims.

In the drawings,

Figure 1 is a plan view in detail of a dial plate used in the gage that embodies the invention; and Fig. 2 is a view, partially in elevation and partially in section, of a gage that embodies the invention.

As herein shown in preferred form, a casing 1 of suitable material contains any desired pressure or level indicating mechanism, not shown herein, as the latter does not form *per se* a part of the invention. A suitable post 2 in the casing which is detachably mounted on the bottom thereof in the usual manner or other like means, supports a dial plate 3. The latter has an upturned marginal flange 4 on the upper edge face of which a shield 5 of suitable transparent material, as glass, is clamped by means of an exterior collar 6 having an inturned annular flange 7. The collar is in screwthreaded engagement with the casing and there may be a packing washer 8 interposed between the shield and the flange 7 if desired.

As a consequence of this construction access is readily had to the gage by merely unscrewing the collar and removing the shield which leaves the dial plate fully exposed and subject to withdrawal when the post that supports it is loosened as by any fastening members which may connect the bottom of it with the casing. The reassembling is likewise as quickly accomplished, as the usual casing rings between the dial plate and shield, which are necessary in the ordinary construction to give space for the pointer ordinarily employed to travel between the shield and the dial plate, are lacking. It is to be noted that if the parts are proportioned as herein illustrated, the flange 4 is quite clear of the casing wall. Therefore, when the collar is brought against the dial, the latter yields sufficiently on its supports, which are way within the margins, so that the dial accommodates itself to any irregularities of position or variations in thickness of the parts, and there is a very close joint established between the shield and dial plate. Consequently the operator does not have to adjust these parts and the whole structure returns to initial position and relation readily without great effort on the part of the assembler.

Obviously, changes in the details of construction may be made without departing from the spirit of my invention and I do not care to limit myself to any particular form or arrangement of parts.

What I claim is:—

1. In a gage, a casing, a dial-supporting means in the casing, a dial-plate secured on said means and provided with an expansible flange, a shield resting on the outer face-edge of said flange and a collar engaging over the casing adapted to force the shield against the flange and expand the same.

2. In a gage, a casing, a dial-supporting means in the casing, a dial-plate secured on said means provided with an upturned expansible flange, a shield resting on the outer edge-face of said flange and an adjustable collar engaging over the casing and forcing the shield into contact with the flange.

3. In a gage, a casing, a dial-supporting means in the casing, a dial plate secured on said means provided with an upturned expansible flange, a shield resting on the outer edge-face of said flange and a screwthreaded collar engaging over the casing and forcing the shield into contact with the flange.

4. In a gage, a casing, a dial-supporting means in the casing, a dial-plate secured on said means provided with an upturned, annular, expansible flange, a shield resting on the outer edge-face of said flange, a screw-threaded collar engaging over the casing adapted to force the shield into contact with the flange, and a packing-washer between said collar and said shield.

In testimony whereof I affix my signature in presence of two witnesses.

PHILO M. GELATT.

Witnesses:
C. R. STICKNEY,
A. M. DORR.